(No Model.)

C. N. DENNETT.
CARRIAGE.

No. 557,195.  Patented Mar. 31, 1896.

Witnesses:
Walter E. Lombard
M. E. Bowditch

Inventor:
Charles N. Dennett
for J. W. Porter Atty

UNITED STATES PATENT OFFICE.

CHARLES N. DENNETT, OF AMESBURY, MASSACHUSETTS.

CARRIAGE.

SPECIFICATION forming part of Letters Patent No. 557,195, dated March 31, 1896.

Application filed November 22, 1895. Serial No. 569,799. (No model.)

*To all whom it may concern:*

Be it known that I, CHARLES N. DENNETT, of Amesbury, in the county of Essex and State of Massachusetts, have invented a new and useful Improvement in Carriages, which will, in connection with the accompanying drawings, be hereinafter fully described, and specifically defined in the appended claims.

Figure 1:
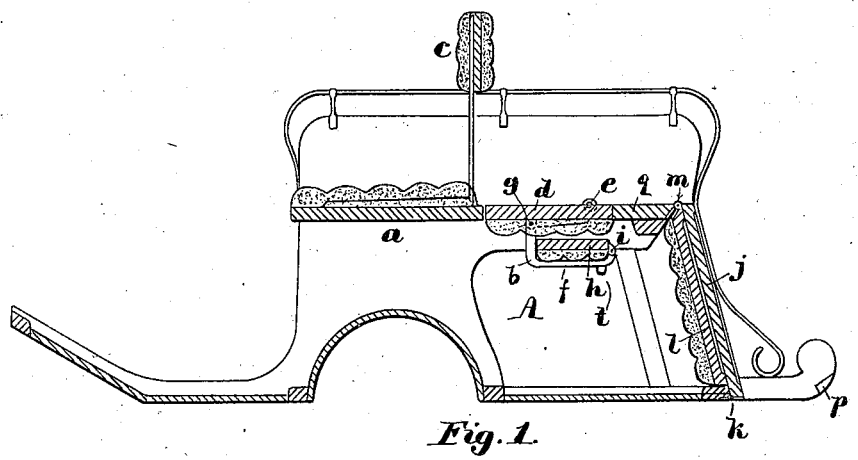
Figure 2:
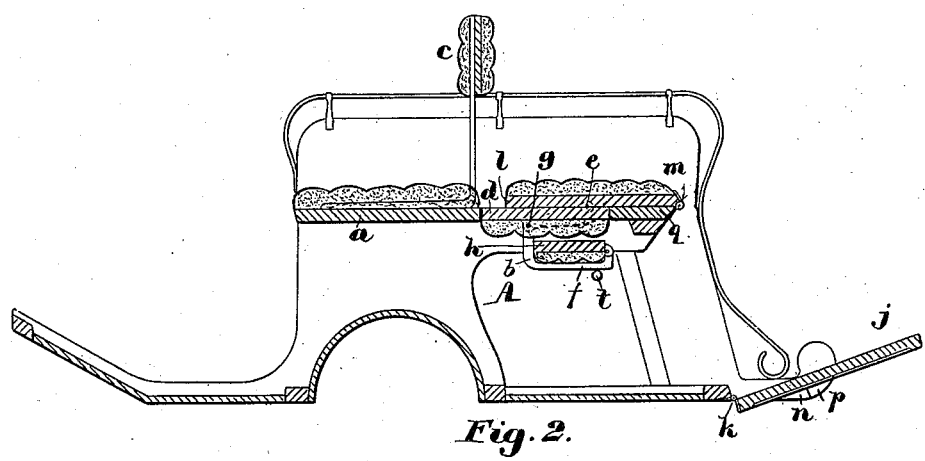
Figure 3:
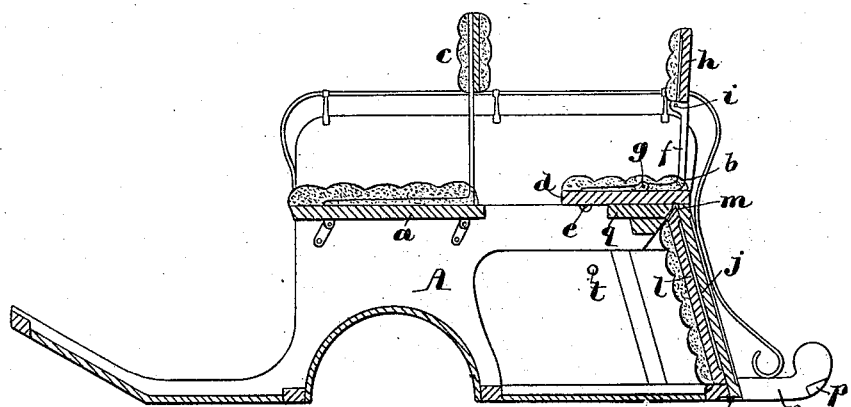

In said drawings, Figure 1 is a sectional elevation, the section being vertical and in the longitudinal line of the carriage-body and seats and the elevation showing the right-hand side of the body, and as arranged to be used with one seat. Fig. 2 is a view similar to Fig. 1, but showing the carriage as arranged to be used with two seats, one seat facing to the front and the other to the rear. Fig. 3 is also a view similar to Fig. 1, but showing two seats, both facing to the front.

The object of this invention is to provide a carriage that can be arranged for use with but one seat facing to the front, or with two seats, one facing to the front and one to the rear, or with two seats, both facing to the front, as may in any case be desired; and it consists in the peculiar construction, arrangement, and combination of the several parts, as will be next herein described in connection with the accompanying drawings, and then pointed out in the appended claims.

Referring again to said drawings, A represents the body side, which may be of any style or kind to which my present improvement is adapted. The front seat is shown at $a$ and is provided with a back $c$, which is double, so that either its front or rear side can be utilized as a support. Another seat (shown at $d$) is hinged to body A at $e$, and it has a back $h$, the supporting-irons of which are hinged at $i$ to the lower irons $f$, that are formed with an angle $b$, that is hinged to the seat at $g$, so that when said irons are turned up they are retained in that position, and the back $h$ when turned up will also remain in that position, and when said seat is turned over, as shown in Figs. 1 and 2, its back $h$ will fold upon irons $f$, as shown in those figures.

The tailboard $j$ is hinged to the body at $k$, and when turned out it rests upon studs $p$, that extend inward from sills $n$, that extend to the rear beyond the inclosed portion of the body, so that when the tailboard thus rests upon said spurs it is at the desired angle for the feet of the persons riding on seat $l$.

The rearward-facing seat is shown at $l$ and is hinged at its top edge at $m$, and when this seat is used it is turned over upon the fixed stay $q$ and the reversed seat $d$, as shown in Fig. 2. It will thus be seen that when seat $l$ is turned down out of use and tailboard $j$ and seat $d$ are both closed, the entire body in rear of seat $a$ is closed, and when seat $d$ is in position for use then all parts in rear of it are closed, and when seat $l$ is in position for use then seat $d$ is turned down as part of the deck-panel.

The front seat may be arranged upon jumping-irons, by which to position it somewhat more to the front when seat $d$ is in use; but such jumping-seats are now common and well known.

A pin $t$ may be inserted in body A to aid in supporting the back of seat $d$ when the same is turned down out of use.

It will be well understood from an inspection of the drawings herewith presented that the irons shown are duplicated at the two sides of the carriage, and hence it is sufficient to show them upon one side only.

The object in having back $c$ double-faced is that when seat $l$ is in use, as in Fig. 2, said back answers for both seats.

In lieu of the sills $n$ extending to the rear of the closed box-like part of the body any desired and suitable projection may be employed to support the studs $p$ on which the rear part $j$ rests when turned out as a footrest.

Having thus described my invention, what I claim as new, and desire to secure by Letters Patent, is—

1. A carriage provided with a forward-facing seat $a$ and a rear seat $l$ formed and arranged to be turned up for use as a seat and to be turned down inside the tailboard $j$ when not in use, substantially as specified.

2. In a carriage, and in combination with forward-facing seat $a$ and the rearward-facing seat $l$ arranged to be turned up for use and to be turned down inside the tailboard when not in use, the middle seat $d$ arranged to be turned up for use as a forward-facing seat when seat $l$ is turned downward, substantially as specified.

3. The seat $d$ hinged at $e$ and arranged to be turned up for use as a forward-facing seat and to be turned down out of use, and having back $h$ hinged to part $f$ that is formed with an angle $b$ that is hinged to said seat $d$ at $g$: whereby when said seat is turned up for use the back rests upon said angle $b$, as specified.

4. In a carriage, the combination of seat $a$ arranged for use as a front seat, the seat $d$ arranged for use as a forward-facing rear seat, the seat $l$ arranged to be used as a rearward-facing rear seat and to turn down inside a hinged tailboard and with said seat $d$ to constitute a continuous deck-panel when not in use as seats, substantially as specified.

5. In a carriage, the sills $n$ extended to the rear beyond the hinges $k$ of the tailboard, and provided with studs $p$ extended inward from said sills to serve as supports for the tailboard when turned down to serve as the footrest of the passengers on seat $l$, substantially as specified.

CHARLES N. DENNETT.

Witnesses:
  T. W. PORTER,
  M. E. BOWDITCH.